UNITED STATES PATENT OFFICE.

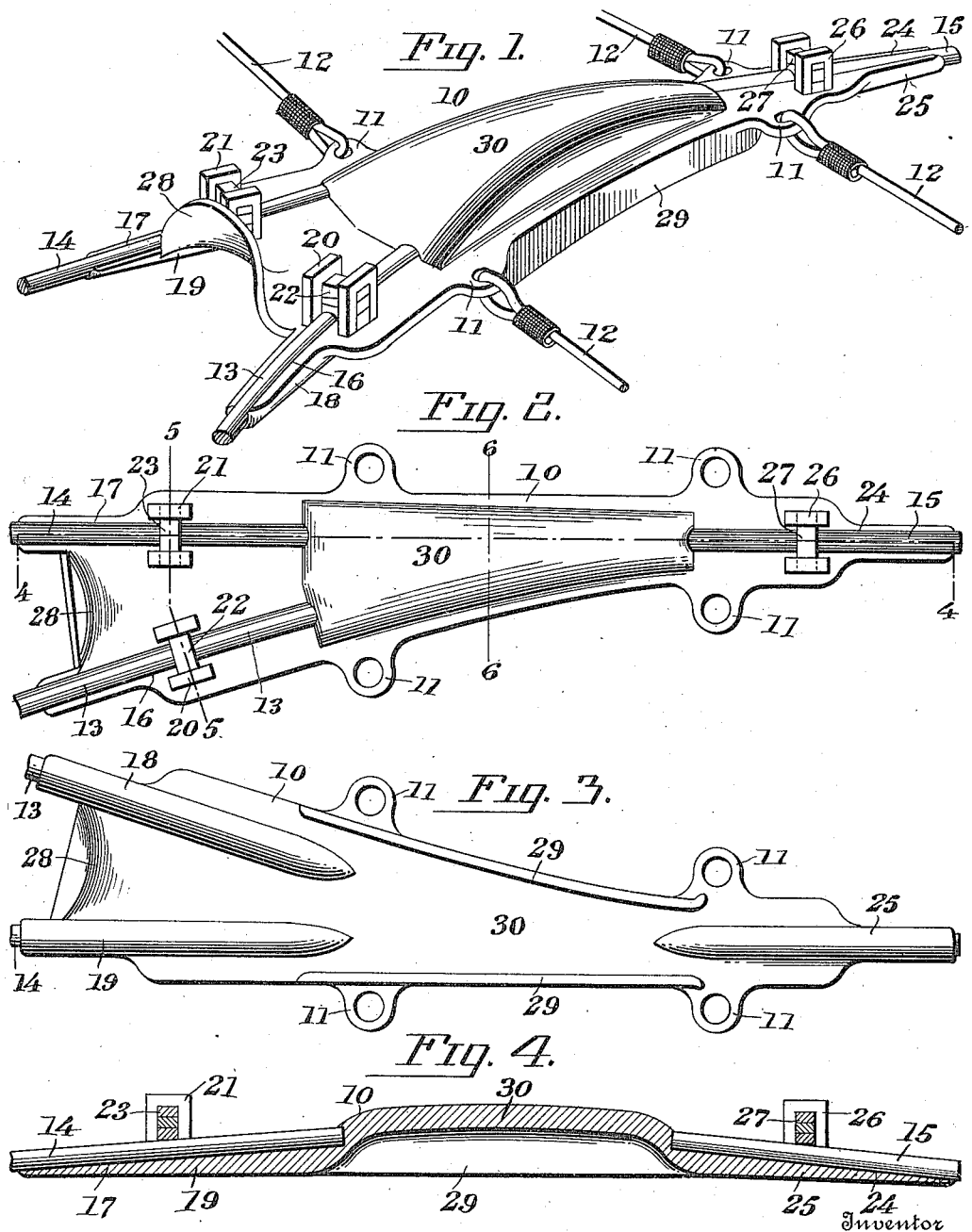

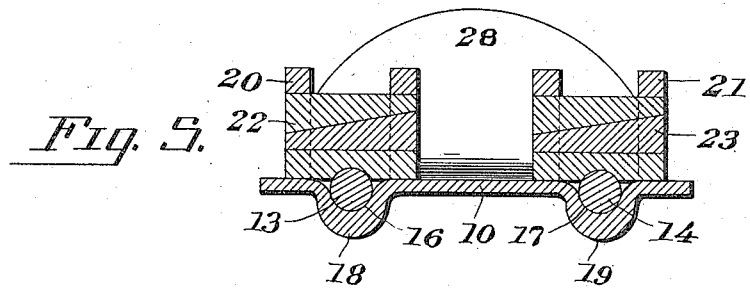
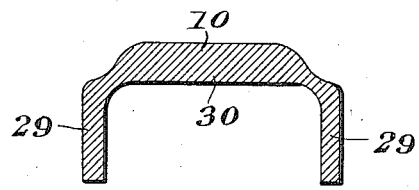
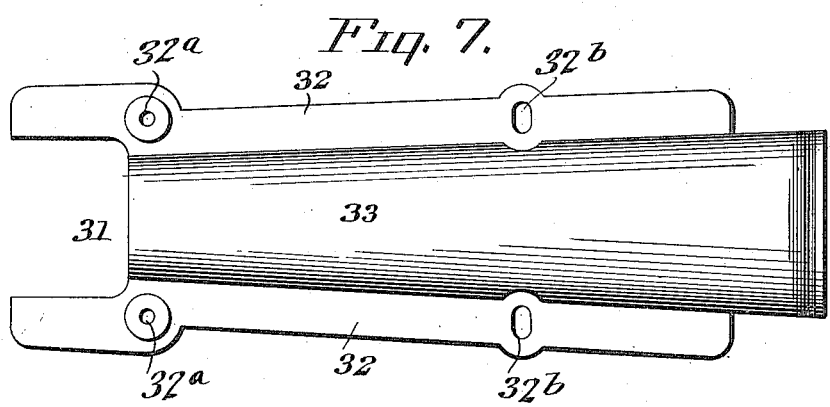
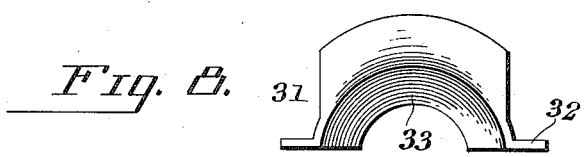

FRANK H. BOYLE, OF CHAMPAIGN, ILLINOIS.

TROLLEY-WIRE SWITCH.

1,148,439.   Specification of Letters Patent.   Patented July 27, 1915.

Application filed January 24, 1913. Serial No. 744,025.

*To all whom it may concern:*

Be it known that I, FRANK H. BOYLE, a citizen of the United States, residing at Champaign, in the county of Champaign and State of Illinois, have invented new and useful Improvements in Trolley-Wire Switches, of which the following is a specification.

An object of the invention is to provide a trolley wire switch for preventing the disengagement of a trolley wheel or other conductor with a wire when the trolley car is switched from one track into another.

The invention embodies, among other features, a switch supported by suitable guy wires and having connected thereto the usual trolley or current conveying wires upon which the wheel on the pole of the trolley car operates, the device being provided to prevent the discontinuance of the flow of current from the trolley wheel to the motive mechanism of the car when the car passes from one track to another through the medium of a switch.

In the further disclosure of the invention reference is to be had to the accompanying drawings, constituting a part of this specification, in which similar characters of reference denote corresponding parts in all the views, and in which:

Figure 1 is a perspective view of the device, showing the same in applied position; Fig. 2 is a plan view of the device as shown in Fig. 1; Fig. 3 is a bottom plan view; Fig. 4 is a vertical longitudinal sectional view taken on the line 4—4 in Fig. 2; Fig. 5 is a vertical transverse sectional view taken on the line 5—5 in Fig. 2; Fig. 6 is a vertical transverse sectional view taken on the line 6—6 in Fig. 2; Fig. 7 is a plan view of a separate guard for attachment to a trolley wire switch that is not provided with a guard; and Fig. 8 is an end view of the device shown in Fig. 7.

Referring more particularly to the views, use is made of a plate 10 provided with a series of eyelets 11 adapted to receive therethrough the usual guy wires 12 for supporting the plate 10 in a horizontal position in order that trolley wires 13, 14 can be connected to the plate at one end thereof and a trolley 15 connected to the plate at the other end thereof, so that the ends of the trolley wires 13, 14, and 15 will lie substantially in a horizontal plane, the plate 10 at one end thereof being provided with a plurality of recesses 16, 17 adapted to receive therein the respective trolley wires 13, 14 and forming depending longitudinally extending contact members 18, 19 upon which the usual trolley wheel is adapted to operate after the trolley wheel leaves one of the trolley wires 13, 14, spaced uprights 20, 21 being arranged to project upwardly from the plate 10 on both sides of the recesses 16, 17 respectively so that the trolley wire 13 will pass between the uprights 20 and the trolley wire 14 will pass between the uprights 21, wedges 22 being provided to pass through slots in the uprights 20 to rigidly secure the end of the trolley wire 13 in the recess 16 and wedges 23 being provided to pass through slots in the uprights 21 to rigidly secure an end of the wire 14 in the recess 17, a recess 24 similar to the recesses 16, 17 being formed in the other end of the plate 10 to receive an end of the trolley wire 15 and forming a contact member 25 arranged to extend longitudinally with respect to the trolley wire 15 to receive the trolley wheel after the same leaves the trolley wire, uprights 26 being provided on both sides of the recess 24 so that the inner end of the trolley wire 15 will pass therebetween with suitable wedges 27 similar to the wedges 22, 23 passing through slots in the uprights 26 to rigidly secure the trolley wire 15 in the recess 24.

At that end of the plate 10 to which the trolley wires 13, 14 are connected there is formed integrally with the plate a concave upwardly projecting guard 28 interposed between the trolley wires 13 and 14 and consequently between the recesses 16 and 17 in which the trolley wires repose, the said guard being provided to direct the trolley wheel into engagement with the under side of the plate 10 if the wheel should accidentally become disengaged from the trolley wires at the point of connection of the trolley wires with the plate. In order to prevent the disengagement of the trolley wheel with the plate 10 after the same leaves the contact members 18, 19 and 25 in passing into engagement with the plate, depending integral flanges 29 are formed on the plate and extend from the inner ends of the contact members 18 to the inner end of the contact member 25, the said flanges constituting guides to prevent the trolley wheel from lateral movement out of engagement with the under side of the plate. Similarly, the plate 10 at its medial portion is bulged upwardly to form a head 30, the bulge being provided in the plate between the inner ends of the contact members 18, 19 and the contact member 25 and having the contour of the under side thereof forming a continuation of the inner ends of the contact members 18, 19 and 25 to more positively retain the trolley wheel in engagement with the plate after the trolley wheel leaves one of the contact members.

It will now be seen by referring to the views that when a trolley car advancing along the track and passing from one track to another through the medium of a switch, passes beneath the plate 10 with the trolley wheel of the car operating over the trolley wire 13, the trolley wheel after leaving the trolley wire 13, will operate over the contact member 18 forming a part of the plate and then passing into the head 30 of the plate formed by bulging the plate as mentioned heretofore, the trolley wheel being now between the depending side flanges 29 of the plate and prevented from lateral movement out of engagement with the plate. The side flanges 29 converge as they approach the inner end of the contact member 25 so that the trolley wheel will be directed toward the contact member 25 and will pass on to the same as the car advances into the switch and passes on to the other track over which the trolley wire 15 is arranged, it being now seen that as the trolley car advances farther along the track beneath the trolley wheel 15 and beyond the vertical plane of the plate 10, the trolley wheel will pass from the contact member 25 onto the trolley wire 15.

In Figs. 7 and 8 I disclose a guard 31 including an integral plate 32 and a guard member 33 formed with the plate 32, the said plate 32 being provided with openings 32$^a$ adapted to receive bolts therethrough for securing the guard 31 in rigid position on the trolley wire switch if the trolley wire switch is not provided with a guard such as the guard 28 formed with the plate 10 as disclosed in the views preceding 7 and 8. It will thus be seen that the guard member 33 will project from the switch between the wires 13 and 14 and will take the place of the upwardly turned guard 28, the said guard member 33 being further provided with a plurality of openings 32$^b$ adapted to have the ends of suitable guy wires passed therethrough to support a guard member relatively to the switch.

Now it will be seen that with a device of the character described a trolley car or other vehicle of a similar nature can readily pass from one track to another through the medium of the switch without being deprived of its motive power on account of what is known as the jumping of the pole or the disconnection of the trolley wheel with the current conveying medium, the plate 10 being provided and arranged to receive and conduct the trolley wheel from one trolley wire to another at the moment the car passes from one track to another and through the switch provided to connect the tracks.

Having thus described my invention, I claim:

In a device of the class described, the combination with a plate having a central upwardly bulged portion and provided with grooves terminating at the ends of the bulged portion, of trolley wires reposing in the said grooves and having their extremities lying against the bulged portion, means on the upper face of the plate and engaging the trolley wires for rigidly securing the same, a plate like vertical guard formed at one end of the plate by having the end of the plate bent upwardly, said guard lying between a plurality of the trolley wires, and lugs formed with the plate and adapted to have supporting wires attached thereto for holding the plate in a horizontal position, said guard extending transversely to the said plate at its greatest width.

In testimony whereof I affix my signature in presence of two witnesses.

FRANK H. BOYLE.

Witnesses:
M. MOLLER,
JOHN W. SEERS.